INVENTOR.
JOHN B. MORSE

BY Brown and Mikulka
and
James L. Neal
ATTORNEYS

INVENTOR.
JOHN B. MORSE

BY Brown and Mikulka
and
James L. Neal
ATTORNEYS

United States Patent Office 3,616,733
Patented Nov. 2, 1971

3,616,733
RETAINER FOR MULTILAMP PHOTOFLASH UNIT
John B. Morse, Cambridge, Mass., assignor to Polaroid Corporation, Cambridge, Mass.
Filed July 1, 1969, Ser. No. 838,211
Int. Cl. G03b 9/70; H01r 13/54
U.S. Cl. 95—11 R                    20 Claims

ABSTRACT OF THE DISCLOSURE

Apparatus for releasably mounting a multilamp photoflash unit including a plurality of resilient prongs adapted to have a hollow post of such unit inserted thereon. Adjacent surfaces of the prongs are formed to provide contours which prevent insertions of any portion of the hollow post between the prongs.

SUMMARY OF THE INVENTION

This invention is directed to apparatus useable in flash photography for releasably mounting a multilamp photoflash unit on a photographic camera. The multilamp unit incorporates a connecting portion defining a hollow post and at least one lug extending radially from the post.

The mounting assembly defines a plurality of elongated resilient prongs adapted to have the hollow post inserted thereon and capable thereafter of exerting a radial outwardly directed force against the inner surface of the post. The prongs releasably retain the multilamp unit on the camera when insertion is complete. Adjacent surfaces of the elongated resilient prongs form configurations which cooperate to resist insertion of any portion of the hollow post between the resilient prongs to thereby avoid injury which tends to result if the resilient prongs are spread apart. At the same time, the configurations of these surfaces is such as to permit deflection of the prongs toward each other during the insertion operation. In a preferred embodiment, the mounting apparatus includes a rotatably mounted base having members extending therefrom and engageable with the aforesaid lug for rotating the multilamp unit when the base is rotated.

A primary object of this invention is to provide improved apparatus for releasably mounting a photoflash unit upon a photographic camera.

It is another object of this invention to provide a multiprong retaining device for releasably mounting a photoflash unit wherein the apparatus includes structure for resisting the insertion of any portion of the unit between the prongs to thereby protect the prongs from injury.

DETAILED DESCRIPTION OF THE DRAWINGS

Figure 1:
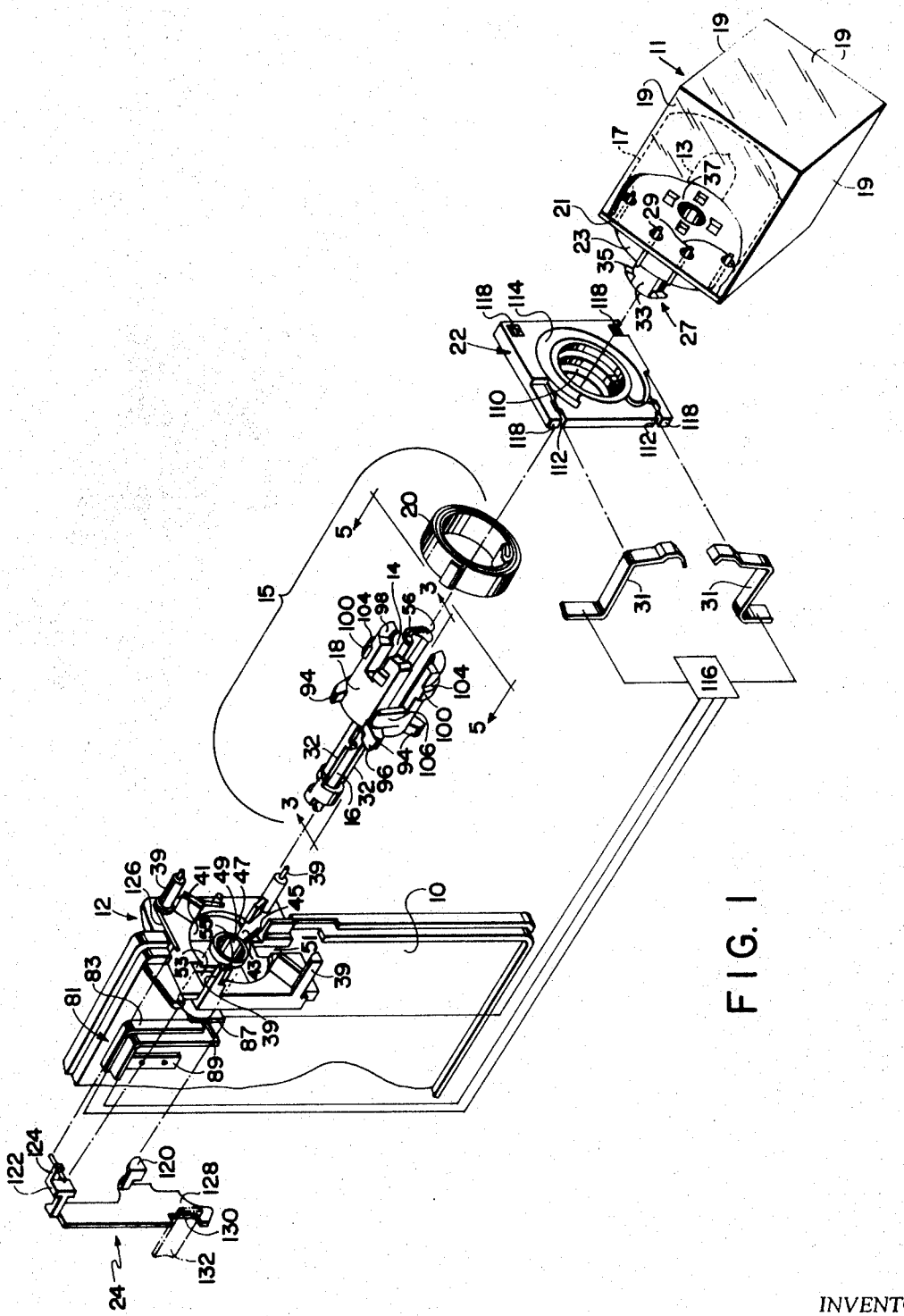
FIG. 1 is an exploded perspective view of a preferred embodiment of this invention.

The preferred embodiment of this invention illustrated in the drawings is adapted to be mounted on a camera (not shown in its entirety) and to normally form a permanent part of such camera for purposes of releasably and rotatably mounting multilamp photoflash unit 11.

Unit 11 comprises a generally cubic housing supporting a photoflash lamp, 13, and an individual reflector, 17, in each of four peripheral faces designated by numeral 19. The unit is provided with support 21 including contact supporting ring 23 and engageable portion 27. The contact ring locates a pair of lead-in wires 29 from each lamp for selective contact with a pair of cooperating terminals 31 included within the photographic flash assembly. Engageable portion 27 includes hollow post 33 and four radial outwardly extending lugs 35 spaced uniformly about the outward extremity of the post. Hollow post 33 defines engageable shoulder 37 at the end thereof which joins support 21.

The illustrated preferred embodiment is adapted to automatically rotate a unit 11 in response to operation of a mechanism in the photographic camera. Rotation of unit 11 could be a function of operation of a film advancement mechanism, exposure producing operation of the shutter blades, shutter blade resetting operation or the like. One structure capable of operating the assembly in response to exposure producing operation of camera shutter blades is disclosed in United States patent application Ser. No. 716,051 filed Mar. 26, 1968 in the name of Bruce K. Johnson and entitled Exposure Control Mechanism for a Photographic Camera.

The assembly includes member 10 constituting part of the camera and forms base plate 12 which receives sub-assembly 15. The sub-assembly comprises multilamp unit retainer 14, switch actuator 16, mount 18 and drive spring 20 and is operatively supported between base plate 12 and cover 22. Slide 24, mounted adjacent the side of base plate 12 opposite the side on which sub-assembly 15 is mounted, defines portions extending through the base plate for cooperation with the sub-assembly to control rotational movement thereof, as will hereafter be described.

Base plate 12 includes means 39 securable to cover 22 by an ultrasonically formed weld or other convenient attachment. Circular slot 41 in base 12 includes interrupted sector 43 which defines slot ends 45 and 47 for controlling multilamp unit rotation as hereafter described. Base 12 also defines central opening 49 for receipt of sub-assembly 15 and openings 51 and 53, openings 51 and 53 being for receipt of slide 24. Anchor 55 is provided for spring 20.

Retaining member 14 defines a pair of identical members 26 arranged in face to face relationship so that configurations of each complement configurations of the other. Members 26 are joined at one end by connecting structure 28 formed integrally with the members and defining a central opening 30.

Figure 2:
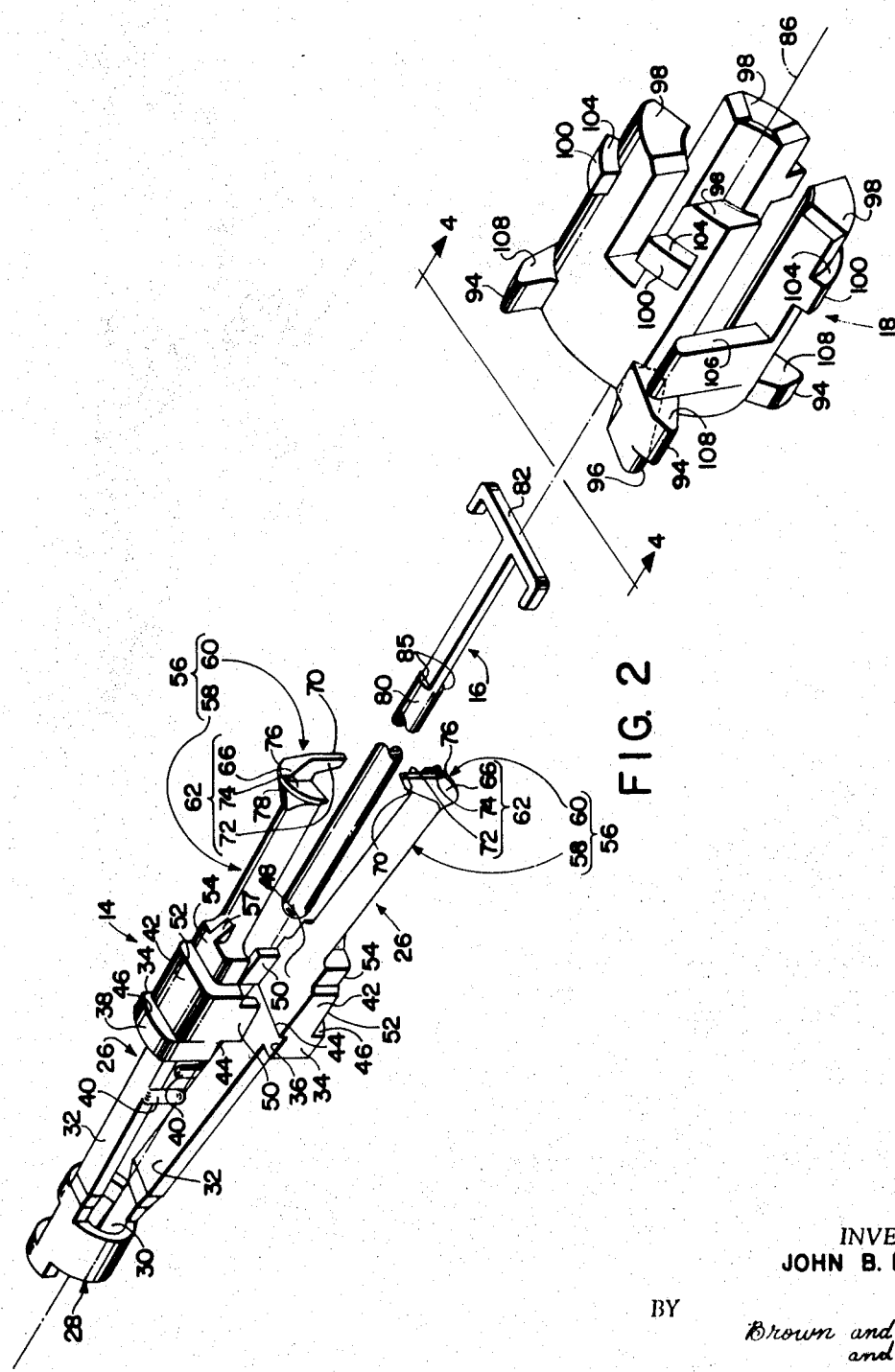
FIG. 2 is an exploded perspective view showing in detail a portion of the apparatus illustrated in FIG. 1.
Figure 3:
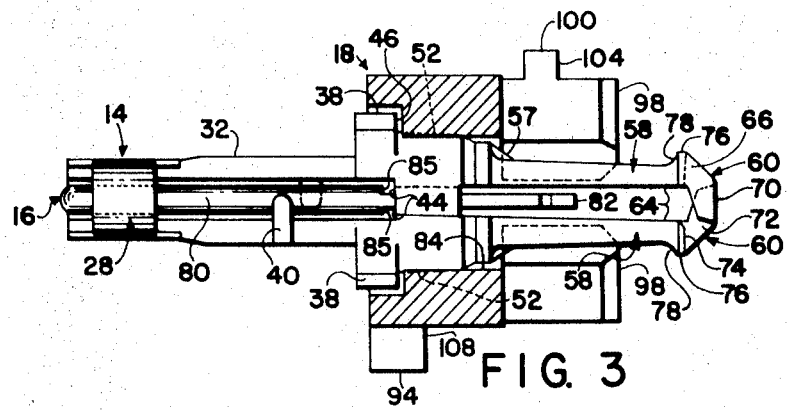
FIG. 3 is a view taken along line 3—3 of FIG. 1.
Figure 4:
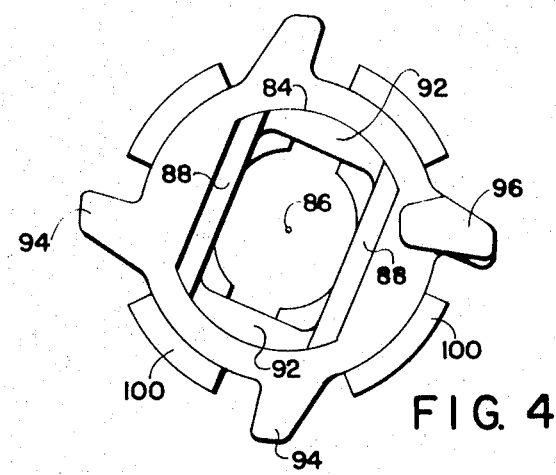
FIG. 4 is a view taken along line 4—4 of FIG. 2.
Figure 5:
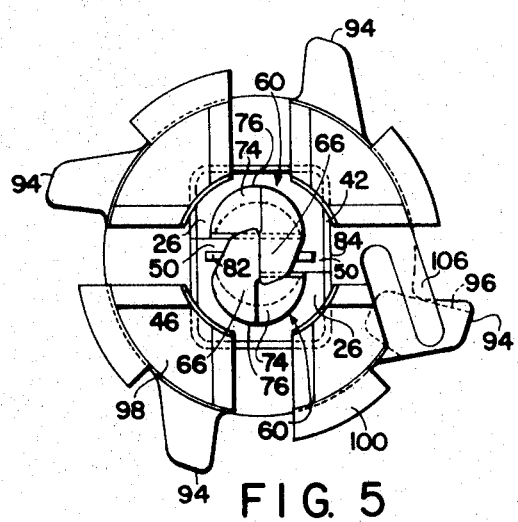
FIG. 5 is a cross sectional view taken along lines 5—5 of FIG. 1.

Members 26 have sides 48 facing inwardly of retainer 14, toward each other. These members comprise legs 32 extending from their connected ends and terminating in collars 34 having plane inside faces 36 and opposed curved outside faces 38. Between collars 34 and connecting structure 28 each leg is provided with a tongue 40 cooperable with switch actuator 16 as hereafter described. Necks 42 extend from collars 34 opposite legs 32. The junction of collars 34 and necks 42 define inside shoulders 44 and outside shoulders 46. Each neck includes plane inside face 48, extension 50 along one side of face 48 and outside face 52 converging slightly toward the inside face. Convergent faces 52 are best shown in FIGS. 2 and 3.

The side and outside surfaces of necks 42 converge sharply to form bases 54 from which elongated resilient prongs 56 extend for detachably receiving unit 11. A ramp 57 extends from each base 54 part way up each prong 56.

Each prong 56 includes a shank 58 and a head 60, in which head defines an outwardly projecting detent 76 and surfaces 62 uniquely configured to define contours disposed in overlapping relationship when sub-assembly 15 is operatively assembled. Each surface 62 includes portion 66, surface 72 and seat 74. Stated differently, heads 60 of the prongs form complementary contoured surfaces 62 having portions 66 which slope from one side of crests 70, surfaces 72 which drop sharply from the other side of the crests and seats 74.

As illustrated, in the preferred embodiment the prongs 56 are depicted as comprising integrally formed shanks 58 and heads 60. Shanks 58 and those portions of heads 60 forming detents 72 establish a projection for releasably retaining a multilamp unit 11. Those portions of the heads forming contoured surfaces 62 establish a means for resisting insertion of any portion of hollow post 33 between prongs 56. Obviously, the shanks 58 and heads 60 may alternately be formed as separate parts and subsequently joined together. Also, if desired, an element comprising the contoured surfaces may be formed as a separate member and subsequently joined to the other portions of the prongs.

Detents 76 slide into the hollow post of the multilamp unit as the prongs are inserted thereinto. Curved surfaces 78 are provided along the underside of the detents for engagement with shoulder 37 of the unit 11 upon complete insertion of the prongs into the hollow post.

Actuator 16 for switch 81 is generally T-shaped and comprises elongated rod 80 and flattened cross piece 82, joined together to form edges 85.

Mount 18 comprises means forming an opening 84 having a configuration adapted to receive necks 42 of members 26 when sub-assembly 15 as assembled, as will hereafter be explained. Opening 84 defines central axis 86. Opposed sides 88 of the opening diverge near the base of mount 18. The other opposed sides provide arcuate shoulders 92 for receiving collars 34. Peripherally of the base of mount 18 are four teeth 94 spaced at equiangular intervals for cooperation with slide 24. Projection 96 depends from one of the teeth for cooperation with base plate 12.

Four extensions 98 spaced at equiangular intervals extend in parallel relationship with central axis 86 to surround prongs 56 when sub-assembly 15 is assembled. The extensions cooperate with lugs 35 of the multilamp unit. Ledge 100 extends outwardly from each extension 98 to serve as a retainer for coiled power spring 20 and to provide bearing surface 104.

Coiled drive spring 20 is adapted to be positioned around mount 18 and is attachable to means 106 of the mount at one end and to anchor 55 of base plate 12 at its other end. The spring continuously biases sub-assembly 15 for counterclockwise rotation.

Cover 22 includes thrust bearing surface 110, openings 112 through which terminals 31 pass and channel 114. Terminals 31 cooperate with lead-in wires 29 to connect the flash lamp directed toward the scene to be photographed in photoflash circuit 116. Channel 114 permits unobstructed movement of the lead-in wires as the photoflash lamp assembly rotates. Means 118 on cover 22 cooperates with means 39 of base 12 to mount the cover to the base so that sub-assembly 15 and coiled drive spring 20 are supported between them, thrust bearing surface 110 retaining bearing surface 104 and opening 49 rotatably retaining legs 32 of the sub-assembly.

Slide 24 carries first pallet 120 and second pallet 122 and is mounted for reciprocal sliding movement. The slide is mounted adjacent base 12 with pallets 120 and 122 extending through openings 51 and 53 of the base for engagement with teeth 94 of sub-assembly 15, the teeth and slide being operable as an escapement mechanism. Post 124 extends from pallet 122 and is engageable by spring means 126 which biases the slide in the upward direction. Extension 128 of the slide forms opening 130 which receives operator 132. The operator is movable according to a down and up motion for transmitting downward motion to the slide and subsequently permitting upward movement thereof. Operator 132 moves slide 24 in response to camera operation and may extend from camera apparatus such as the shutter responsive mechanism described in the aforesaid U.S. Pat. application Ser. No. 716,051.

Switch 81 and terminals 31 form a portion of control circuit means 116. The control circuit is operable according to an ambient code and a flash mode. Pole 83 is resilient and biased for contact with pole 87 to condition circuit 116 for ambient light photography. Pole 83 is movable from contact with pole 87 into contact with pole 89, against its bias, by actuator 16 to condition the circuit for photography according to a photoflash mode.

Circuit 116 is operable for influencing photographic camera exposure production and, when conditioned for operation according to the photoflash mode, for igniting a photoflash lamp in timed relationship to photographic exposures. One example of such a circuit and the operation thereof is disclosed in the aforesaid U.S. Pat. application Ser. No. 716,051.

Assembly

Sub-assembly 15 is assembled as hereafter described.

Switch actuator 16 is located between members 26 so that elongated rod 80 extends through central opening 30 and cross piece 82 is positioned between prongs 56. Edge 85 is located for subsequent retension by inside shoulders 44. Members 26 are then advanced toward each other until extensions 50 abut inside faces 48 for bringing configured surfaces 62 into overlapping relationship with each other. Retainer 14 and switch actuator 16 are then inserted into opening 84 of mount 18.

As members 26 of retainer 14 are advanced toward each other, tongues 40 extended from legs 32 engage rod 80 of switch actuator 16 to deflect members 26 into misalignment to assure that the aforesaid configured surfaces 62 move into overlapping relationship without interferring with each other. When this is accomplished, shoulders 44 are positioned for retaining edge 85 to prevent switch actuator 16 from escaping retainer 14.

As the assembled retainer 14 and actuator 16 are inserted into mount 18, heads 60 of prongs 56 advance into opening 84, along central axis 86 and are guided thereinto by opposed diverging sides 88. Necks 42 of members 26 are guided into opening 84, the guidance being assisted by ramps 57. Opening 84 has a configuration complementing the continuous, substantially rectangular cross sectional shape defined by both necks 42 when extensions 50 of each neck abuts opposing inside faces 48 of the other neck and when the abutting side surfaces of the necks are aligned. Outside faces 52 converge slightly to establish a leading convergent end having an outside perimeter which is slightly smaller than the inside perimeter of opening 84 and a training divergent end defining an outside perimeter which is greater than the inside perimeter of opening 84.

As the necks 42 are advanced into opening 84, cooperation between the necks and the opening serves to draw members 26 back into alignment and thereby bring contoured surfaces 62 into precise overlapping relationship with each other so that surfaces 72 thereof abut. Legs 32 are placed in slight torsion by the realignment and thereby cause tongues 40 to apply a slight drag on rod 80 to stabilize actuator 16. Coaction between necks 42 and opening 84 establishes a friction fit between retainer 14 and mount 18. The firmness of the fit increases as the necks are forced into opening 84. When they have been pressed into the opening by a sufficient amount, the fit is firm enough to hold retainer 14, actuator 16 and mount 18 in assembled condition, thereby forming sub-assembly 15.

Drive spring 20 is then installed upon mount 18 by attaching the inner end of the spring to the mount at spring retaining means 106 so that the spring is coiled around the mount and retained by the ledges 100 and surface 108 of teeth 94. The outer end of the spring is then free for subsequent attachment to anchor 55 of base plate 12.

The mounting of the subassembly between base 12 and cover 22 complete the assembly.

Legs 26, connecting structure 28 and switch actuator 16 of the subassembly are inserted through opening 49 in base 12 until projection 96 is located in circular slot 41 and connecting structure 28 positions rod 80 adjacent switch 81 to enable the rod to operate the switch as it moves back and forth along central axis 86. Terminals 31 are then installed and cover 22 is positioned over base 12 so that means 39 of base 12 and means 18 on cover 22 are contiguous for attachment to each other by an ultrasonic weld or other convenient attachment. When attached, bearing surface 110 engages bearing surface 104 defined by ledges 100 and thereby acts as a thrust bearing for assembly 15; the inner surface of opening 49 in base 12 retains a portion of the legs 32 of subassembly 15 so that the entire apparatus is held in assembled condition.

Operation

In the rundown condition of the photoflash apparatus, the assembly for mounting units of the type designated 11 is so positioned that each of the four faces 19 of a mounted unit would be oriented at approximately a 40° angle relative to a plane of the scene being photographed. In this condition, one surface of projection 96 abuts end 45 of slot 41 to prevent counterclockwise rotation of the assembly under the influence of drive spring 20 and to locate teeth 94 of sub-assembly 15 so that pallets 120 and 122 of slide 24 do not intercept the teeth upon up and down movement thereof. For purposes of discussion it will be taken that, in this rest condition, unit 11 is not installed. Pole 83 of switch 81 is thus in contact with pole 87, in accordance with its bias, to condition the circuit for operation according to an ambient light mode. The bias of pole 83 is effective to advance switch actuator 16 to the right, as viewed in FIG. 1.

A multilamp unit of the type designated 11 is mounted on the assembly by bringing hollow post 33 into alignment with prongs 56 and inserting the prongs into the hollow post. Contoured portions 66 of heads 60 initially contact hollow post 33 and cause deflection of prongs 56 inward toward each other. As the prongs are inserted into the post, detents 76 engage the inner surface of the post and exert a radial outwardly directed force thereon. When the hollow post 33 of the multilamp unit 11 is fully inserted onto the prongs 56, the resilient characteristic of those prongs releasably engages the detents 76 against the shoulder 37. Lead-in wire supporting ring 23 seats in channel 114 to enable successive pairs of lead-in wires 29 to contact terminals 31 as successive lamps are directed toward the scene to be photographed. Extensions 98 rise from mount 18 for location around hollow post 33, between outwardly extending lugs 35 to effect proper angular orientation of the unit relative to the assembly and, subsequently, to impart rotation to the unit. It will be recognized that the prongs 56 may suffer unrepairable damage if forceably separated. The unique configurations of the surfaces 62 and their arrangement within the fully assembled apparatus illustrated in the drawings resists the inadvertent insertion between the prongs 56 of any portion of the hollow post 33. While providing this highly advantageous feature, these configurations facilitate the resilient displacement of the prongs 56 in a direction towards each other during the process of inserting the hollow post 33 thereon.

The mounting of multilamp unit 11 brings the wall portion of post 33 into engagement with cross piece 82 of actuator 16 for advancing the actuator to the left to thereby cause rod 80 to deflect resilient post 83 from contact with post 87 into contact with the post 89. Circuit 116 is thus conditioned for photography according to the flash mode.

Unit 11 is manually rotated clockwise to tension drive spring 20. The spring is fully tensioned when the other surface of projection 96 engages end 47 of slot 41. The shapes of pallets 120 and 122 and teeth 94 of sub-assembly 15 are such that manual clockwise rotation of the subassembly is freely permitted. The ends of the circular slot are so located that the photoflash lamp package is permitted to move through an angular rotation of approximately 320° When the surface of projection 96 abuts end 47 of slot 41 none of the faces of unit 11 are precisely directed toward the scene to be photographed; an over travel of approximately 10° having been provided. Upon release of the assembly after manual rotation, the tension in drive spring 20 advances the sub-assembly substantially 10° counterclockwise to take up the overtravel and accurately position the sub-assembly so that one face of unit 11 is directed toward the scene to be photographed, one of the teeth 94 then being releasably retained by pallet 120 to prevent further rotation of the escapement wheel under the influence of the drive spring. When this position is obtained, lead-in wires 29 for the one flash lamp directed toward the scene to be photographed are in electrical contact with terminals 31 of the photoflash apparatus. The one flash lamp is thus connected in the photoflash circuit to be ignited in timed relationship with exposure producing operation of the apparatus.

The events which occur as a result of down and up movement of operator 132 will now be described. In timed relationship with exposure production, downward movement of the operator drives slide 24 downward, against the bias of spring 126. First pallet 120 disengages the tooth 94 of sub-assembly 15 with which it is engaged to permit rotation of the assembly, under the influence of spring 20. The sub-assembly advances approximately 45° to an intermediate position where another of the teeth designated 94 is engaged by pallet 122. Subsequently, operator 132 moves upward, thus permitting slide 24 to move upward under the influence of spring means 126. Upward movement of the slide displaces pallet 122 from the tooth with which it is engaged and permits a further substantially 45° rotation of sub-assembly 15. Pallet 120 is positioned to engage another of the teeth 94 and halt rotation of the sub-assembly upon completion of the aforesaid further 45° rotation. The two increments of rotation permitted by the down and up movement of the slide produce an amount of rotation (90°) appropriate for directing the next succeeding splash lamp toward the scene and effecting electrical contact between its leads and terminals 31. Successive operations of operator similarly cause successive lamps to be directed toward the scene to be photographed. When the last (fourth) photoflash lamp is directed toward the scene to be photographed, projection 96 on sub-assembly 15 is positioned along circular slot 41 so that the leading surface thereof is angularly displaced from end 45 of the circular slot by approximately 40°. Subsequent operation of operator 132 accompanying ignition of the aforesaid lamp causes down and up movement to be imparted to slide 24, as described above. The tooth of the sub-assembly retained by first pallet 120 is released and the sub-assembly rotates under the influence of drive spring 20. Spring pallet 122 moves downward into position for engaging another of the teeth 94, but just prior to engagement of the second pallet by one of the teeth, the surface of projection 96 abuts end 45 of circular slot 41 to terminate rotation of the sub-assembly and thus the photoflash lamp unit. The photoflash apparatus is now returned to the original position wherein the teeth of sub-assembly 15 are so located that they are not engageable by the first and second pallets. In this position, the faces of the photoflash lamp unit are all oriented at approximately a 40° angle relative to the plane of the scene to be photographed. This orientation serves to indicate that all the lamps in the unit are exhausted; thus a new lamp supply is needed if photoflash photography is to be continued.

It should be understood that the terms "up," "down," "clockwise," "counterclockwise," "left," "right" and the like are used in the foregoing disclosure to describe movement of various elements of the preferred embodiment as

I claim:

1. Photographic apparatus for releasably mounting a photoflash unit comprising at least one flashlamp, electrical leads connected to such flashlamp and means for mounting such unit including a hollow post, comprising, in combination:
   (a) first means for releasably retaining such hollow post, said first means including a plurality of resilient projections configured to have such hollow posts inserted thereon and to resiliently exert a radially outwardly directed force against the inner surface of such post at such time to releasably engage such post;
   (b) second means for resisting the insertion of any portion of such hollow post between said projections; and
   (c) third means for supplying electrical energy to such leads.

2. The apparatus of claim 1 wherein each said projection has a free end adapted to be the first portion thereof to enter such hollow post as such hollow post is inserted thereon and wherein said second means comprises a substantially rigid member extending from at least one of said projections adjacent said free end thereof towards another of said projections.

3. The apparatus of claim 1 wherein said second means comprises complementary contoured surfaces formed on adjacent portions of said projections.

4. The apparatus of claim 1 wherein said projections are mounted in spaced apart relationship for resilient displacement towards each other and said second means comprises a plurality of rigid members each one of which extends from said resilient projections, said rigid members being formed having complementary contoured surfaces configured to continually present an obstruction to the insertion of any portion of such post therebetween while permitting a limited amount of radially inwardly directed movement of said projections as such post is inserted thereon.

5. The apparatus according to claim 1 wherein such photoflash unit comprises an array of such flashlamps, each having electrical leads extending therefrom, said apparatus further comprising means for intermittently advancing such photoflash unit to sequentially locate such leads of such flashlamps for energization by said energy supplying means.

6. The apparatus according to claim 1 wherein such photoflash unit comprises an array of flashlamps arranged peripherally around an axis for direction toward a scene to be photographed one at a time in sequence, said apparatus further comprising means for intermittently rotating such unit about such axis to sequentially direct such flashlamps toward such scene.

7. Photographic apparatus for releasably mounting a photoflash unit comprising at least one flashlamp, electrical leads connected to such flashlamp and means for mounting such unit including a hollow post, comprising, in combination:
   (a) first means for releasably retaining such hollow post, said first means including a plurality of projections configured to have such hollow post inserted thereon and mounted to be resiliently displaced inwardly with respect to each other as such post is inserted thereon to thereafter exert an outwardly directed force against the inner surface of such post thereby releasably engaging such post;
   (b) second means for continually resisting the insertion of any portion of such hollow post between said projections, said second means being configured to facilitate inward displacement of said projections with respect to each other as such post is inserted thereon; and
   (c) means for supplying electrical energy to such leads.

8. The apparatus of claim 7 wherein said second means comprises a substantially rigid member extending from at least one of said projections adjacent the free end thereof toward another of said projections.

9. The apparatus of claim 7 wherein said projections are mounted in spaced apart relationship for resilient displacement towards each other and said second means comprises a plurality of substantially rigid members extending from said projections having complementary contoured surfaces configured to continually present an obstruction to the insertion of any portion of such post therebetween while permitting a limited amount of radially inwardly directed movement of said projections as such post is inserted thereon.

10. A photographic flash assembly for retaining and rotating a multilamp unit including a base support having a plurality of photoflash lamps mounted thereon with corresponding leads for each lamp disposed below said base support and a hollow post depending from said base support, said post having at least one radially extending lug, the flash assembly comprising in combination:
    (a) means forming a plurality of elongated resilient prongs for insertion into such hollow post to releasably retain such multilamp unit on such flash assembly, said prongs having means for resisting insertion of any portion of such hollow post between said prongs for avoiding injury to said prongs;
    (b) means engageable with such one lug for rotating such multilamp unit; and
    (c) circuit means for sequential electrical connection with such corresponding leads of the unit lamps to sequentially fire such lamps with rotation of such unit.

11. An assembly according to claim 10 wherein said surface means comprises a contour extending from at least one of said prongs into overlapping relationship with at least one other of said prongs.

12. An assembly according to claim 10 wherein said means forming a plurality of elongated resilient prongs comprises two prongs.

13. An assembly according to claim 12 wherein said surface means defining adjacent configured surfaces comprises a contour extending from each of said prongs into overlapping relationship with the other prong.

14. An assembly according to claim 10 wherein said surface means defining adjacent configured surfaces comprises a contour extending from adjacent the end of at least one of said prongs toward an adjacent prong.

15. An assembly for mounting a photographic flashlamp unit including a base support having at least one flashlamp mounted thereon to face in a predetermined direction with leads extending from said flashlamp to a position adjacent said base and a hollow cylindrical post depending from said base, said assembly comprising:
    (a) a plurality of elongated resilient prongs for insertion into such hollow post to releasably retain such unit on such assembly, said prongs having surface means for resisting insertion of any portion of such hollow post between said prongs for preventing injury to said prongs;
    (b) terminal means disposed adjacent the base of such unit for electrical connection with such leads corresponding to such one flashlamp facing in such predetermined direction; and
    (c) circuit means for controllably firing such one flashlamp.

16. A photographic flash assembly for use with a multilamp flash unit including a base support having a plurality of flash lamps and individual reflectors mounted thereon with corresponding igniting assemblies for causing the ignition of said flash lamps and a hollow post depending from said base support, said post having a plurality of spaced radially extending lugs, the flash assembly comprising in combination
- a rotatably mounted member comprising:
  - a plurality of spaced apart resilient prongs configured for having said hollow post inserted thereover,
  - detent means on at least one of said prongs for engaging a portion of said multilamp unit for releasably retaining said multilamp unit on said flash assembly, and
  - blocking means associated with a free end of at least one of said prongs for resisting the insertion of any portion of said hollow post between said prongs;
- means rotatable with said member for engaging at least one of said radially extending lugs for rotating said multilamp unit when said member is rotated; and
- firing means for sequentially igniting said flash lamps through said igniting assemblies to sequentially fire select ones of said flash lamps.

17. The photographic flash assembly of claim 16 wherein said resilient prongs are mutually outwardly biased and spaced to define a gap therebetween and said blocking means is formed as a portion of at least one of said prongs.

18. The photographic flash assembly of claim 16 wherein said blocking means is configured integrally within a free end of at least one of said prongs.

19. The photographic flash assembly of claim 16 wherein said blocking means comprises complementary contoured surfaces formed on adjacent portions of said prongs.

20. The photographic flash assembly of claim 16 wherein said blocking means comprises a plurality of rigid members each one of which extends from a said prong, said rigid members being formed having complementary contoured surfaces configured to continually present an obstruction to the insertion of any portion of said post therebetween while permitting a limited amount of mutually inwardly directed movement of said prongs as said post is inserted thereon.

References Cited
UNITED STATES PATENTS 3,353,468   11/1967   Beach _____ 240—1.3 X

FOREIGN PATENTS 1,064,867   12/1953   France _____ 339—91
561,831   8/1931   Germany _____ 339—147 P SAMUEL S. MATTHEWS, Primary Examiner R. P. GREINER, Assistant Examiner U.S. Cl. X.R.

240—1.3; 339—91 L